United States Patent [19]

Chen, Sr. et al.

[11] Patent Number: 4,628,067

[45] Date of Patent: Dec. 9, 1986

[54] MICROPOROUS POLYBENZIMIDAZOLE PARTICULATES

[75] Inventors: Paul N. Chen, Sr., Charlotte; Richard O. Tucker, Oakboro, both of N.C.

[73] Assignee: Celanese Corporation, New York, N.Y.

[21] Appl. No.: 571,022

[22] Filed: Jan. 16, 1984

[51] Int. Cl.$^4$ .................... B01J 39/18; C08G 2/30; C08L 77/06

[52] U.S. Cl. .................................. 521/25; 521/33; 528/491; 528/502; 525/435

[58] Field of Search ................ 521/30, 25, 33; 528/502, 491; 525/435

[56] References Cited

U.S. PATENT DOCUMENTS

| | | | |
|---|---|---|---|
| 3,703,502 | 11/1972 | Venderbos et al. | 528/502 |
| 3,951,920 | 4/1976 | Senoo et al. | 521/64 |
| 4,110,529 | 8/1978 | Stoy | 528/491 |
| 4,260,652 | 4/1981 | Taketani et al. | 521/64 |

*Primary Examiner*—Joseph L. Schofer
*Assistant Examiner*—Peter F. Kulkosky
*Attorney, Agent, or Firm*—Forrest D. Stine

[57] ABSTRACT

Novel microporous particles of polybenzimidazole (PBI) resin, characterized by a reduced bulk density, a surface area of at least 10 m$^2$/g, a porosity of at least about 10%, and an average pore diameter of from about 50 to 500 Angstroms are provided by emulsification-precipitation or atomizing-non-solvent quenching techniques. The disclosed microporus PBI particles are particularly suitable for use as substrates in chromatographic processes such as ion-exchange, separations, purifications, etc., as well as catalysts or chemical reagents in polymer supported reactions. Microporous PBI particles of varying acidity/basicity and/or anionic/cationic exchange characteristics, and/or containing various functional groups for use in chemical conversions, may be obtained by treatment of the PBI resin with various organic and inorganic acids, either during particle formation or subsequent thereto.

27 Claims, No Drawings

MICROPOROUS POLYBENZIMIDAZOLE PARTICULATES

BACKGROUND OF THE INVENTION

The present invention relates to polybenzimidazole resins useful as the stationary phase in chromatographic processes such as ion-exchange, purifications, separations, etc., and as polymeric catalysts and chemical reagents useful in polymer supported chemical reactions. It particularly relates to polybenzimidazole resins in microporous particulate form which possess improved performance characteristics in processes of the above types as compared with previously known forms of polybenzimidazole.

As used herein, the term "chromatographic processes" is used in a generic sense referring to processes of the type wherein a mobile phase (gas or liquid) is contacted with a stationary phase, comprising the novel microporous polybenzimidazole particulates of this invention. Accordingly, while as will be described more fully hereinafter the instant polybenzimidazole particulates possess ion-exchange characteristics, the scope of the present invention is not limited to processes which rely on an ion-exchange mechanism, but includes within its scope other processes, well known to those skilled in the art such as separations, purifications, etc., which rely on the polarity, adsorptivity and/or acid/base characteristics of the invention polybenzimidazole particulates.

Polybenzimidazoles (hereinafter referred to as PBI) are a well known class of polymers characterized by a high degree of thermal stability, chemical resistance and toughness. As a result of these properties, PBI has found application in a wide variety of uses, such as replacements for asbestos in high temperature applications such as gloves, conveyor belts and plastic composites. In addition, a sulfonated, textile grade, PBI fiber has been developed by the assignee of the subject application for use, inter alia, in high performance fabrics. See *Textile Research Journal*, Vol. 52, No. 7, pages 466–472 (July 1982).

Due to its excellent thermal and chemical resistance properties, PBI has also been suggested for use in semipermeable membranes (see U.S. Pat. Nos. 3,699,038; 3,720,607; 3,851,025; and 4,020,142), as well as in substrates for chromatographic processes (see U.S. Pat. Nos. 3,560,158 and 3,408,336). The possibility of developing a PBI substrate useful in chromatographic processes has been particularly attractive to the art since the resins commonly used for this purpose, such as the crosslinked styrene copolymers possess less than satisfactory chemical and thermal stability. Prior art attempts to develop such PBI substrates have been largely unsuccessful, however.

While as can be seen from U.S. Pat. Nos. 3,408,336; 3,560,158; and 4,394,500, particulate forms of PBI having a shape useful for chromatography applications have heretofore been prepared by those skilled in the art, the particulates described in those patents are not disclosed as having a microporous structure. As is well known to those skilled in the art, resins useful in chromatographic procedures such as ion-exchange should desirably possess a high porosity and preferably have a macroreticular or other highly porous structure. Resins which do not possess such porosity do not possess sufficient surface area to provide chromatographic capacities competitive with the conventional resins employed in chromatography such as the crosslinked styrene copolymers marketed by, e.g., Rohm & Haas Company under the tradename Amberlyst. ®

In addition, the practical utility of the PBI substrates heretofore known in the art in chromatographic processes such as ion-exchange has been further limited by the fact that PBI possesses only weakly basic anion exchange characteristics. In contrast, the conventional resins used in chromatographic procedures such as the cross-linked styrene copolymers are available in both anion and cation exchange forms having a wide range of acidities/basicities.

In addition to PBI and the Amberlyst ® type resins, other resins have also been suggested by the prior art for use in chromatography applications. Anion exchange resins of the weakly basic type containing nitrogen heterocyclic rings, for example, have been described in U.S. Pat. No. 3,311,572. Such resins comprise crosslinked copolymers formed by copolymerizing using emulsion techniques, a nitrile-containing vinyl monomer, a polyvinyl monomer and a nitrogen-containing diamine heterocycle compound such as imidazoline or tetrahydropyrimidine. It is disclosed that polymer beads having a porous macroreticular structure may be obtained by including a diluent in the polymerization recipe which acts as a precipitant for the resulting copolymer. Such anion exchange resins do not possess PBI's excellent thermal stability, however, and thus are not desirable for use in high temperature applications.

Crosslinked bead copolymers prepared by pearl copolymerization of 4-vinylpyridine, styrene and divinylbenzene, functionalized by reaction with various acids have also been suggested for use as reagents in polymer supported chemical reactions (See, *Journal of Macromolecular Science-Chemistry*, A 11 (3), pages 515–534 (1977); and *Journal of Organic Chemistry*, Vol. 43, No. 13, pages 2618–2621 (1978)), as well as acid scavengers in non-aqueous systems.

In addition, the prior art has suggested that fibers prepared of benzimidazole-terephthalic acid copolymer, complexed with metal ions, may be used as ion-exchangers. While useful for some purposes, fibers are not desirable for use in chromatography due to the generation of higher back pressures than those encountered with polymers in bead form. In addition, as noted above, useful polymeric supports desirably possess a high porosity.

As can be seen from the foregoing discussion, the prior art has yet to develop a PBI material which combines the attractive chemical and physical properties of PBI resins with a form which is useful in chromatographic processes or supported chemical reactions or syntheses.

SUMMARY OF THE INVENTION

Accordingly, it is an object of the present invention to provide PBI resins in a microporous particulate form which is useful in chromatographic processes and/or in supported chemical reactions.

It is an additional object of the present invention to provide microporous particulates comprised of functionalized PBI resins which exhibit cation exchange, anion exchange, and a wide range of acid/base characteristics, ranging from strong acid to basic characteristics.

In accordance with the present invention, these and other objects are achieved through the provision of microporous particles of PBI resin, comprising either PBI per se or PBI resins functionalized by treatment with inorganic or organic acids, characterized by a reduced bulk density, a specific surface area of at least about 10 $m^2/g$, a porosity of at least about 10%, and an average pore diameter of from about 50 to about 500 Angstroms.

Also provided in accordance with the present invention is a process for preparing the above-described microporous PBI particulates, comprising the steps of:

a. forming a solution of a polybenzimidazole resin in a suitable solvent comprising from about 2 to 10% by weight of the polybenzimidazole resin;

b. emulsifying the polybenzimidazole solution with a non-polar organic solvent in a volume ratio of polybenzimidazole solution to non-polar organic solvent of from about 1:2 to about 1:4 under conditions of shear sufficient to produce substantially spherical droplets of polybenzimidazole resin;

c. precipitating the spherical droplets of polybenzimidazole resin from the emulsion in the form of substantially spherical microporous beads by contacting the emulsion with a non-solvent for the polybenzimidazole resin; and d. recovering the resulting microporous particles of polybenzimidazole resin.

Optionally, up to about 15% by weight of an organic or inorganic acid may be introduced into the PBI solution of step (a) of this process in order to modify the functional properties of the resin. Alternatively, the recovered microporous PBI particulates may be treated with a solution of an organic or inorganic acid containing from about 1 to 10% by weight of the acid for this same purpose.

In an alternative embodiment, the invention microporous PBI particulates may be also prepared by the steps of:

a. forming a solution of a polybenzimidazole resin in a suitable solvent comprising from about 2 to about 20% by weight of the polybenzimidazole resin;

b. converting the solution of step (a) into a stream of liquid droplets;

c. quenching the stream of liquid droplets with a non-solvent for the polybenzimidazole resin to produce microporous particles of polybenzimidazole resin; and d. recovering the resulting microporous particles of polybenzimidazole resin.

As with the emulsification-precipitation procedure described above, the solvent of step (a) of this process may optionally include up to about 15% by weight of an organic or inorganic acid in order to modify the functional properties of the resin. Similarly, the recovered microporous PBI particulates may be treated with a solution of an organic or inorganic acid containing from about 1 to 10% by weight of the acid for this same purpose.

The microporous PBI particulates of this invention are highly advantageous for use as substrates in ion-exchange, purifications, separations and/or chemical conversions. Accordingly, in another embodiment, the present invention also provides an improved process for the purification, separation, identification, absorption and/or chemical conversion of a substance present in a mobile phase, which comprises passing the mobile phase over a stationary phase comprising microporous particles of polybenzimidazole or polybenzimidazole functionalized by treatment with an organic or inorganic acid, and characterized by a reduced bulk density, a specific surface area of at least about 10 $m^2/g$, a porosity of at least about 10%, and a average pore diameter of from about 50 to about 500 Angstroms.

Other objects, features and advantages of the present invention, as well as the preferred modes of operation thereof, will become apparent to those skilled in the art from the following detailed description of the preferred embodiments.

DESCRIPTION OF THE PREFERRED EMBODIMENTS

The polybenzimidazoles useful in the PBI microporous particulates of this invention may comprise any polybenzimidazole resin known to those skilled in the art. Typical polymers of this class and their preparation are more fully described in U.S. Pat. No. 2,895,948; U.S. Pat. No. Re. 26,065, and in the *Journal of Polymer Science*, Vol. 50, pages 511-539 (1961), which are herein incorporated by reference. The polybenzimidazoles consist essentially of recurring units of the following Formulae I and II. Formula I is:

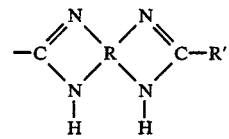

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

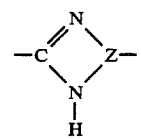

wherein Z is an aromatic nucleus having the nitrogen atoms forming the benzimidazole ring paired upon adjacent carbon atoms of the aromatic nucleus.

Preferably, aromatic polybenzimidazoles are selected, e.g., polymers consisting essentially of the recurring units of Formulae I and II, wherein R' is at least one aromatic ring or a heterocyclic ring.

As set forth in U.S. Pat. No. Re. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxylic compound selected from the class consisting of (a) the aromatic/aliphatic esters of an aromatic dicarboxylic acid, (b) the aromatic/aliphatic esters of a heterocyclic dicarboxylic acid wherein the carboxyl groups are substituents upon a carbon in a ring compound selected from the class consisting of pyridine, pyrazine, furan, quinoline, thiophene and pyran, (c) an anhydride of an aromatic dicarboxylic acid, and (d) a free aromatic or aliphatic dicarboxylic acid.

Examples of polybenzimidazoles which have the recurring structure of Formula I are as follows:
poly-2,2'-(m-phenylene)-5,5'-bibenzimidazole;
poly-2,2'-(pyridylene-3'',5'')-5,5'-bibenzimidazole;
poly-2,2'-(furylene-2'',5'')-5,5'-bibenzimidazole;
poly-2,2'-(naphthalene-1'',6'')-5,5'-bibenzimidazole;
poly-2,2'-(biphenylene-4'',4''')-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexeneyl-5,5'-bibenzimidazole;
poly-2,2'-(m-phenylene)-5,5'-di(benzimidazole) ether;
poly-2,2'-(m-phenylene)-5,5'-di(benzimidazole) sulfide;
poly-2,2'-(m-phenylene)-5,5'-di(benzimidazole) sulfone;
poly-2,2'-(m-phenylene)-5,5'-di(benzimidazole) methane;
poly-2',2''-(m-phenylene)-5',5''-di(benzimidazole) propane-2,2; and
poly-2',2''-(m-phenylene)-5',5''-di(benzimidazole) ethylene-1,2
where the double bonds of the ethylene groups are intact in the final polymer.

The preferred polybenzimidazole for use in the present invention is poly-2,2'-(m-phenylene)-5,5'-bibenzimidazole, the recurring unit of which is:

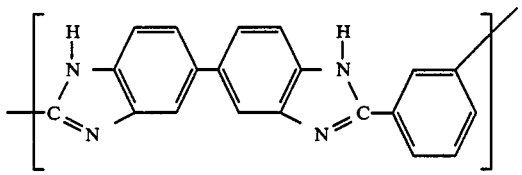

Any polymerization process known to those skilled in the art may be employed to prepare the polybenzimidazole employed herein. Representative techniques for preparing polybenzimidazoles are disclosed in U.S. Pat. Nos. 3,509,108; 3,549,603; and 3,551,389, which are assigned to the assignee of the present invention and are herein incorporated by reference.

With respect to aromatic polybenzimidazoles, preferably equimolar quantities of the monomeric tetraamine and dicarboxyl compound are introduced into a first stage melt polymerization reaction zone and heated therein at a temperature above about 200° C., preferably at least 250° C., and more preferably from about 270° to 300° C. The reaction is conducted in a substantially oxygen-free atmosphere, i.e., below about 20 ppm oxygen and preferably below about 8 ppm oxygen, until a foamed prepolymer is formed having an inherent viscosity, expressed as deciliters per gram, of at least 0.1 and preferably from about 0.13 to 0.3, the inherent viscosity (I.V.) as used herein being determined from a solution of 0.4 grams of the polymer in 100 ml. of 97 percent $H_2SO_4$ at 25° C.

After the conclusion of the first stage reaction, which normally takes at least 0.5 hour and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.6, e.g., 0.80 to 1.1 or more.

The temperature employed in the second stage is at least 250° C., preferably at least 325° C., and more preferably from about 350° to 425° C. The second stage reaction generally takes at least 0.5 hour, and preferably from about 1 to 4 hours or more.

A particularly preferred method for preparing the polybenzimidazole is disclosed in the aforesaid U.S. Patent No. 3,509,108. As disclosed therein aromatic polybenzimidazoles may be prepared by initially reacting the monomer in a melt phase polymerization at a temperature above about 200° C. and a pressure above 50 psi (e.g., 300 to 600 psi) and then heating the resulting reaction product in a solid state polymerization at a temperature above about 300° C. (e.g., 350° to 500° C.) to yield the final product.

Microporous Particle Formation

As noted above, the microporous PBI particulates of this invention are prepared by either emulsification-precipitation or atomizing-non-solvent quenching procedures. As used herein the term "atomizing" is used in a generic sense to refer to any procedures of the type wherein a solution of PBI resin is converted into a stream of droplets, including, for example, spraying, dripping, etc., as well as various other procedures as would be apparent to those skilled in the art.

In the first step of the emulsification-precipitation technique process, the PBI resin is dissolved in a suitable solvent in order to provide a PBI solution or dope comprising up to about 10% by weight PBI, and preferably from about 2 to about 10% PBI. In accordance with the present invention, it has been found that the concentration of the PBI is critical to the attainment of the instant microporous particulates, and that solutions containing more than 10% weight do not form stable emulsions. Accordingly, the concentration of PBI is preferably maintained at less than 10% by weight, and most preferably from about 2 to 10% by weight.

The solvents utilized to form the polybenzimidazole polymer solutions include those solvents which are commonly recognized as being capable of dissolving the particular polybenzimidazole polymer. For instance, the solvents may be selected from those commonly utilized in the formation of polybenzimidazole dry spinning solutions. Illustrative examples of suitable solvents include N,N-dimethyl acetamide, N,N-dimethyl formamide, dimethyl sulfoxide, and N-methyl-2-pyrrolidone. Additional representative solvents include formic acid, acetic acid, and sulfuric acid. Particularly preferred solvents comprise N,N-dimethyl acetamide and concentrated sulfuric acid having a concentration of from about 90 to 100% and preferably about 98% by weight. As will be discussed more fully hereinafter, where microporous PBI particles functionalized with —$SO_3H$ groups are desired, the solvent will particularly comprise concentrated sulfuric acid.

As used herein the term "functionalized" means the modification of the basic polybenzimidazole resin in order to introduce functional groups therein. Such groups will generally comprise acid anion groups which are derived from inorganic or organic acids. The functionalization contemplated herein includes both covalently and ionically bonded groups. While not wishing to be bound by any specific theory or mode of operation, it is believed that treatment of the PBI resin with an inorganic or organic acid produces a PBI-acid complex wherein the acid anion group is ionically bonded to the weakly basic heterocyclic nitrogen atoms present in the rings of Formulae I and II above. Such ionic PBI-acid complexes possess anionic exchange properties whose strength varies with the strength of the acid employed in treating the basic PBI resin.

As will be discussed more fully hereinafter, heat treatment of those resins complexed with strong divalent or polyvalent acids such as sulfuric acid, with or without sulfonic acids, phosphoric acids, and boric acids, produce microporous PBI resins having covalently bonded acid groups, e.g., pendant sulfonic acid groups. Such particles exhibit cation exchange characteristics. Both types of functionalized PBI resins are useful, moreover, as polymeric reagents and catalysts in chemical conversions.

Where microporous particulates comprised of functionalized PBI resins are desired, up to about 15% and preferably less than about 4% by weight of an inorganic acid or organic acid may be included in the PBI solution. Examples of such acids include sulfuric acid (where a solvent different than concentrated sulfuric acid is used), organic sulfonic acids such as p-toluene or 2-naphthalene sulfonic acid, HBR, HCl, HF, nitric acid, HI, phosphoric acid, chromic acid, boric acid and various carboxylic acids such as acetic, formic, and citric acid, and mixtures thereof. Preferred functionalized PBI resins include the sulfonates, hydrochlorides, hydrobromides, chromates, and chlorochromates, of polybenzimidazole, of which the sulfonates are particularly preferred. Where the solvent comprises concentrated sulfuric acid, the solvent itself provides the acid needed for functionalization, and accordingly, concentrated sulfuric acid is the preferred solvent for use where a sulfonated PBI microporous particulate is desired.

The exact amount of acid included in the PBI solution will vary according to the degree of functionalization desired. Amounts of acid functionalization agent in excess of 15% by weight are not preferred since the resulting PBI solutions are difficult to emulsify. Where higher degrees of functionalization are desired, or where the particular acid-PBI solution cannot be emulsified satisfactorily, an after treatment described hereinafter may be employed to functionalize the PBI microporous particulates.

One suitable method for dissolving the PBI polymer in the solvent is by mixing the materials at a temperature above the normal boiling point of the solvent, for example, about 25° to 120° C. above such boiling point, and at a pressure of 2 to 15 atmospheres for a period of 1 to 5 hours. Preferred conditions will usually comprise heating the mixture in a stainless steel reactor at a pressure of about 7 atmospheres for 2 hours at a temperature of about 235° C. The resulting solution is then preferably filtered to remove any undissolved polymer. A minor amount of lithium chloride, e.g. about 2% by weight, optionally may be provided in the solution in order to prevent the polybenzimidazole polymer from phasing out of the solution upon standing for extended periods of time.

The resulting PBI dope or solution resulting from the foregoing steps is next emulsified with a non-polar organic solvent. Any solvent sufficiently non-polar for this purpose may be employed. Preferred non-polar organic solvents comprise Varsol ® (a straight aliphatic petroleum solvent) and halogenated solvents such a perchloroethylene. The ratio of PBI solution to non-polar organic solvent is critical to the preparation of a stable emulsion. Typically, this ratio will comprise, on a volume basis, from about 1:2 to about 1:4 parts PBI solution to non-polar organic solvent, and preferably from about 1:2.5 to 1:4 parts PBI solution to non-polar organic solvent.

In order to improve the stability of the emulsion, a minor amount of a surfactant having a polarity intermediate between the PBI solution and the non-polar organic solvent may be added to the emulsion. Such surfactants are well known to those skilled in the art, and include the Tweens ® (polyoxyalkylene derivatives of hexitol anhydride partial long chain fatty acid esters) and the Spans ® (The Span ® type materials are partial esters of the common fatty acids such as lauric, palmitic, stearic and oleic acids, and hexitol anhydrides, i.e., hexitanes and hexides, derived from sorbitol), such as Span ® 80. Where a surfactant is employed, the amount utilized will generally range from about 0.01 to about 2% by weight, and preferably from about 0.1 to 1% by weight.

In addition to a surfactant, the emulsion may also contain a minor amount, e.g., less than about 5% by weight of an additive which enhances formation of the microporous structure of the invention PBI particulates. Suitable additives comprise compounds which are either insoluble or soluble in the solvent used to prepare the PBI solution and are capable of being extracted from the PBI particulates by washing with aqueous or organic solvent or are thermally removable by treatment with hot gases, such as $N_2$ or air. Examples of such soluble additives include polyethylene oxide resins such as Carbowax ®, polypropylene oxide resins, polybutylene oxide resins, and lithium chloride or similar metal salts, of which the Carbowaxes ® are particularly preferred. Examples of such insoluble additives include silica gel, lithium acetate, lithium stearate or similar metal salts, and polyethylene polymers. The use of such additives not only improves the porosity of the final PBI microporous particulates, but in addition promotes the formation of a macroreticular structure.

Formation of the emulsion requires mixing conditions of strong shear. Satisfactory mixing conditions will include a shear sufficient to form a homogeneous dispersion of small substantially spherical droplets of PBI resin.

Following emulsification, the emulsified solution is contacted with a non-solvent in order to precipitate the PBI in the form of substantially spherical polymer particles. Non-solvents useful for this purpose comprise materials which are relatively immiscible (relative to water) with the PBI solution. Preferred non-solvents include aliphatic alcohols having 1 to 4 carbon atoms, of which methanol is particularly preferred. The amount of non-solvent employed is not critical and generally comprises from about 1 to 100 parts of non-solvent per part of PBI solution present in the emulsion. Where desired, the non-solvent may also include from about 0.01 to about 2% by weight of a surfactant, such as those discussed above, in order to avoid agglomeration of the precipitated beads and to retain the fine, spherical structure thereof.

Following precipitation, the final microporous PBI particulates are recovered by filtering, washing with an aqueous solution, preferably water or an aqueous alcohol solution, and then dried at a temperature of from about 60° to about 120° C. for from about 2 to about 12 hours. Where functionalized microporous PBI particulates having covalently bound functional groups, such as for example, sulfonate groups, are desired, a heat set treatment comprising temperatures of at least 180° C., and preferably from about 180° to about 250° C., and a time of at least 30 minutes, and preferably from about 2 to about 10 hours is substituted for the drying step.

Optionally, the recovered microporous particulates may be subjected to an after functionalization treatment by contacting the particulates with a solution of the functionalizing acid containing from about 1 to about 10% by weight of acid. Conveniently, such solution may comprise an aqueous acid solution. The time the particulates are in contact with the acid solution is not absolutely critical, and can be varied to produce various degrees of functionalization. The resulting functionalized beads are then separated from the acid solution by filtering, and then dried or heat set as described above in order to produce beads having the desired type of ionic or covalent functionalization.

In another variation of the foregoing functionalization treatment, the dried microporous PBI particulates may be functionalized in situ prior to use by simply passing the acid solution through a column of the particulates. This procedure is particularly convenient where the particulates are to be employed as anion exchangers or as reagents or catalysts in chemical conversions.

In an alternative embodiment, the microporous PBI particulates of this invention are prepared by an atomizing-non-solvent quenching procedure. In the first step of this procedure, a solution of PBI resin in a suitable solvent (preferably concentrated sulfuric acid or N,N-dimethylacetamide) containing from about 2 to 20% by weight, and preferably from about 10 to 20% by weight of the PBI resin, is prepared as described in detail above. Optionally, this solution may also contain up to about 2% by weight of lithium chloride in order to stabilize the solution; up to about 5% by weight of one or more of the aforementioned soluble types of pore forming additives; and up to about 2% by weight, and preferably from 0.1 to 1% by weight of a suitable surfactant, such as the Spans ® or Tweens ®, in order to improve the flow of the PBI solution through the atomizing apparatus. Where functionalized PBI resin particulates are desired, up to about 15% by weight, preferably up to about 4% by weight, of an organic or inorganic acid may be further included in the PBI solution, as also described above. The particular PBI concentration selected within the aforementioned range is dictated by the desired characteristics of the finished microporous particulates, as well as the practical viscosity limitations imposed by the atomizing apparatus.

The resulting PBI solutiion is then converted into a stream of small, fine liquid droplets. Any procedure well known to those skilled in the art may be employed for this purpose. For example, the PBI solution may be sprayed through an air, airless, or ultrasonic nozzle. Alternatively, the PBI solution may be dripped, impinged upon rotating atomizer plates, etc. The particular technique used for this step is not critical provided that a stream of small, finely divided droplets is obtained. The flow rate of the PBI solution, pressure, air flow (where employed), etc., through the atomizing device is adjusted in order to achieve the aforementioned stream of finely divided liquid droplets of PBI solution. Such conditions will vary depending upon the particular type of atomizing device employed. Where an air spray type device is used, typical operating conditions include a PBI solution flow rate of from about 0.1 to 3 gallons/hour, and preferably from about 0.5 to 1.0 gallons/hour; a pressure of from about 10 to 100 psi preferably from about 25 to 50 psi; and a nozzle diameter of from about 0.1 to 0.8 inches. Preferred air spray devices include a centrally positioned nozzle, such as the air sprayers marketed by Spraying Systems Company, Bellwood, Ill. (Set-up 1A). Typical airless sprayers useful herein include conventional airless paint sprayers such as those marketed by the Wagner Company, Minneapolis, Minn.

Following atomization of the PBI solution, the stream of liquid droplets is quenched with a non-solvent under conditions such that the liquid droplets are converted into substantially spherical beads of solidified microporous PBI resin. For this purpose, the PBI solution is typically sprayed or dripped in a downward direction into a bath of non-solvent, disposed at a distance of 12 to 30, and preferably 15 to 20, inches below the nozzle of the atomizing device. It is essential that the particular height for the nozzle chosen be adequate to permit the formation of small finely divided droplets of PBI solution prior to contacting the non-solvent. The non-solvent may comprise any of the familiar non-solvents for PBI, such as alcohols having from 1 to 4 carbon atoms, and particularly methanol, and may include a small amount, up to about 2% by weight of a surfactant in order to prevent agglomeration of the PBI particulates. The temperature and time conditions employed during the quenching step can vary over wide ranges and typically include temperatures of from about 5° to 80° C. and times of from about a few seconds to several minutes or longer. The particular conditons chosen are not critical provided adequate coagulation of the PBI polymer is obtained.

Following quenching, the resulting solidified beads of microporous PBI resin are recovered by filtration, washed with water or aqueous alcohol solutions, and dried as described in detail above. Similarly to the emulsification-precipitation procedure prepared microporous PBI particulates, the recovered PBI beads may be subjected to an after treatment with an aqueous organic or inorganic acid solution, and/or subjected to a heat-set treatment, as described above, in order to functionalize the same.

The PBI particulates produced by the foregoing procedures comprise substantially spherical beads having a particle size ranging from about 10 to 1000 microns, and a microporous structure as evidenced by a reduced bulk density, typically from about 40 to 80% that of conventional non-porous PBI; a specific surface area of at least about 10 $m^2/g$, and preferably greater than 25 $m^2/g$; a porosity of at least about 10%, and preferably at least 20%, and an average pore diameter of from about 50 to about 500 Angstroms, and preferably from about 75 to about 250 Angstroms.

Test methods useful in measuring the foregoing properties of the instant microporous PBI beads are well known to those skilled in the art, and are described in detail in U.S. Pat. Nos. 4,257,997 and 4,290,987, the entirety of which are hereby incorporated by reference and relied on in their entirety. The particular specific surface area measurement technique employed herein comprises a multipoint BET surface area measurement using nitrogen as the adsorbent gas, and degassing with helium at approximately 250° C. for 4.5 hours. The average pore diameter is calculated from the specific surface area by techniques well known to those skilled in the art.

The particular properties of a given batch of microporous PBI particulates is a function of the specific procedures used in their preparation. Factors which have been found to effect such properties, where the emulsification-precipitation technique of this invention is employed, include the viscosity of the emulsion (which in turn is a function of the molecular weight of the PBI resin, the concentration of PBI in the PBI solution, and the concentration of pore-enhancing additives and surfactants); the shear conditions; polarity differences between the PBI solution and the non-polar organic solvent; and the time between emulsion formation and precipitation, temperature, and polarity of non-solvents used in the precipitation process. Factors which have been found to effect the properties of the invention microporous particulates where the atomizing non-solvent quenching procedure is employed, include the pressure of atomization, the flow rate of the PBI solution, the geometry and size of the nozzle, the viscosity of the PBI solution, temperature of the quenching non-solvent, and the polarity differences between the PBI solution and the quenching non-solvent. In addition, as noted above, in both of these procedures the presence of pore-enhancing additives promotes the formation of a macroreticular structure. Adjustment of these factors may be employed in order to obtain microporous particles having the desired characteristics.

In addition, the functional properties of the invention PBI microporous particulates may be varied by appropriate treatment with acids as described above. As noted above, anion exchange resins may be obtained by forming an ionic complex between the PBI and acid, with the strength of the acid determining the strength of the anion exchange properties. Similarly, cation exchange resins may be obtained by heat setting PBI resins treated with strong acids as also noted hereinabove. As a result of such procedures, strong acid cation exchange resins comprising, e.g., sulfonated PBI having a degree of sulfonation corresponding to a sulfur content of from 1 to 10% by weight, having cation exchange capacities as high as 3 m.eq./gram may readily be achieved through the practice of the present invention.

In addition, the non-functionalized microporous PBI particulates of this invention themselves function as weakly basic anion exchangers, and have a chemical selectivity and absorptivity comparable to other common absorbents such as silcon beads, activated carbon and basic ion exchange resins such as the Rohm & Haas Amberlyst ® resins.

As a result of the foregoing characteristics, the microporous PBI particulates of this invention find application in a wide variety of applications in the chromatography and chemical processing fields. Exemplary chemical end uses include uses as acid scavengers, polymeric brominating agents, oxidizing agents, insoluble acid catalysts, condensation and polymerization catalysts, and chemical reagents and catalysts in various other types of reactions, such as described, e.g., in *Polymer-Supported Reactions in Organic Synthesis*, edited by P. Hodge and D. C. Sherrington, (John Wiley & Sons, 1980). The instant microporous particulates also find application in a variety of ion-exchange, purification, separation, and analytical procedures, such as for example, the recovery of uranyl ions from waste streams, the removal of dichromate from aqueous streams, the separation of phenol, catechol and ortho-dinitrobenzene, the separation of water soluble acids, the removal of phenol from aqueous streams, as well as such other end uses as would be obvious to those skilled in the art.

The invention is additionally illustrated in connection with the following Examples, which are to be considered as illustrative of the present invention. It should be understood, however, that the invention is not limited to the specific details of the Examples.

EXAMPLE I 200 ml of a poly-2,2'-(m-phenylene)-5,5'-bibenzimidazole solution comprising 6% by weight of the PBI resin dissolved in concentrated sulfuric acid (98% by weight $H_2SO_4$) were emulsified with 600 ml of Varsol ® (an aliphatic petroleum solvent) in a blender at an agitation speed of approximately $10^3$ rpm. The resulting emulsion contained a ratio of PBI solution to Varsol of 1:3, and comprised a homogeneous dispersion of tiny PBI droplets dispersed in the Varsol ® solvent.

The emulsion was thereafter quickly quenched with 600 ml of methanol to precipitate the PBI in the form of polymer beads. The substantially spherical beads were collected by filtration, washed with isopropanol, and then dried in a vacuum oven at 75° C. for 12 hours. The resulting PBI beads had a substantially spherical shape, and ranged in size from 20 to 500 microns. Scanning electron microscopy studies of the beads indicated that the beads were microporous having two types of microporous structures. A first type of bead had a macroreticular structure, whereas the second type of bead had a microporous structure comprised of a smooth surface with a porous internal structure.

EXAMPLE II

Following procedures similar to that of Example I, a series of experiments were conducted in order to test the influence of PBI concentration in the PBI solution (dope), the solvent system, the use of surfactants, the ratio of PBI dope solution to emulsifying solvent, and shear conditions in the formation of the microporous PBI beads of this invention. In all cases, the emulsions were precipitated with methanol, washed with aqueous alcohol, filtered, and then dried at 80° C. for 12 hours to produce the final beads. Those beads derived from PBI-$H_2SO_4$ dopes were thereafter given a heat setting treatment at a temperature of about 180° C. for about ½ hour in order to functionalize the same with pendant covalent sulfonic acid groups.

The results of these experiments are set forth in Table I:

TABLE I

| Sample | Solvent[A] System | Ratio[B] | Dope[C] Solids | Shear | Nominal Bead Size (μ) |
|---|---|---|---|---|---|
| 1 | A | 1:3 | 6 | H | >400 |
| 2 | A | 1:3 | 9 | H | 500–1000 |
| 3 | A | 1:3 | 12 | H | Would not form emulsion |
| 4 | B | 1:3 | 3 | H | >200 |
| 5 | A | 1:2.5 | 6 | K | 150–250 |

TABLE I-continued

| Sample | Solvent[A] System | Dope[C] Ratio[B] | Solids | Shear | Nominal Bead Size (μ) |
|---|---|---|---|---|---|
| 6 | C | 1:3 | 3 | W | 50–150 |

[A]Solvent System
A = PBI-DMAc/Varsol
B = PBI-H₂SO₄/Varsol (1% Span-80)
C = PBI-H₂SO₄/perchloroethylene (1% Span-80)
[B]Ratio (PBI dope/Emulsion solvent)
[C]Dope Solids (% PBI dope used)
[D]Shear: H (Shaker), K (Karr liquid extractor), W (Waring blender)

EXAMPLE III

In order to demonstrate the improved performance of the invention PBI microporous particulates in chromatographic applications, the adsorption capacity of spherical PBI beads in accordance with this invention for phenol and HCl from aqueous solutions was compared with an equivalent weight of a typical non-porous prior art form of PBI particulates, PBI fibers. The spherical PBI beads employed in this experiment were prepared by procedures similar to those of Examples I and II, and comprised both non-functionalized and sulfonated PBI beads. Both non-functionalized and sulfonated PBI fibers were likewise evaluated. The resin used in these materials comprised poly-2,2'-m-phenylene-5,5'-bibenzimidazole.

In evaluating the phenol removal efficiency of each of these materials, 0.5 g of the respective PBI absorbent (either the spherical microporous PBI beads of this invention or the non-porous PBI fibers) were contacted with 10 ml of 0.1% by weight of phenol in water for a total permeation time of 15 minutes. The permeate was then collected and examined for residual phenol content by chromatographic analysis, using an HPLC-$C_{18}$ column (Brown-Lee Company), an injection speed of 1.0 ml/min. ($CH_3CN/H_2O$, 20/80), a chart speed of 0.5 cm/min., a detector setting of 268 mm, and a permeate sample size of 10 microliters.

In evaluating the HCl removal efficiency of each of these materials, 0.5 g of th respective PBI absorbent (either the spherical microporous PBI beads of this invention or the non-porous PBI fibers) were contacted with 10 ml of aqueous HCl solution (pH=4.0) for a total permeation time of 15 minutes. 10 ml of permeate was then collected and diluted with 40 ml of neutral water. Residual acid of the permeates was measured by using a pH meter.

A comparison of the physical characteristics and adsorption capacities of each of these PBI materials is set forth in Table II:

TABLE II

| | Spherical Beads (Nominal size 100–300μ) | | Fibers | |
|---|---|---|---|---|
| | Unsulfonated | Sulfonated | Unsulfonated | Sulfonated |
| 1. Structure | Membrane type (skin outside pore inside) or macroreticular type | | Dogbone cross-section with solid internal structure | |
| 2. Bulk density* (gm/ml) | 0.2 | 0.4 | 0.7 | 0.7 |
| 3. Adsorption Capacity | | | | |
| (a) Phenol Removal | >95% | 31% | 17% | 6% |
| (b) HCl Removal | ≧95% | N.A. | 10% | N.A. |
| 4. Specific Surface Area ($m^2/g$) | 36 | 27 | 0.38 | 0.37 |
| 5. Avg. Pore Diameter (Angstroms)** | 80 | 134 | No porosity | No porosity |

*Measured under 10 mm vacuum
**Mathematically calculated from specific surface area.

As can be seen from the foregoing data, the microporous PBI particulates of this invention exhibit a significantly improved performance in chromatographic applications, as compared with the conventionally available non-porous PBI forms known in the prior art.

EXAMPLE IV

This example illustrates the preparation of the invention microporous PBI particulates by the atomizing-non-solvent quenching procedure.

A 15% by weight solution of poly-2,2'-(m-phenylene)-5,5'-bibenzimidazole in N,N-dimethylacetamide was sprayed through an air sprayer having a centrally positioned 0.16 inch nozzle (Spraying Systems Company, Bellwood, Ill., Set-up 1A) at a rate of 0.5 gallons of the PBI solution per hour and an air pressure of 30 psi into a methanol bath maintained at ambient temperature. The nozzle in this experiment was located at a height of about 18 inches above the surface of the methanol bath.

Coagulated substantially spherical beads of PBI resin were then recovered from the methanol bath by filtering, following which the beads were washed and dried under conditions similar to that of Examples I and II. The resulting solidified PBI particulates (beads) had a nominal size range of about 50 to 150 microns and a bulk density of 0.25 g/cc indicating the presence of a microporous structure.

EXAMPLE V

The experiment of Example IV was repeated, substituting, however, commercial airless paint sprayers having a nozzle sizes of 0.022 and 0.028 inches (Wagner Company, Minneapolis, Minn.) for the air sprayer of that example. Similarly to Example IV, the nozzles of the airless sprayers used in these runs were mounted about 18 inches above the surface of the methanol bath. Following the procedures of Examples IV, microporous PBI particulates were produced in each of these runs having a particle size distribution of from about 50 to 150 microns and a bulk density of 0.25 g/cc.

The principles, preferred embodiments and modes of operation of the present invention have been described in the foregoing specification. The invention which is intended to be protected herein, however, is not to be construed as limited to the particular forms disclosed since those are to be regarded as illustrative rather than restrictive. Variations and changes may be made by those skilled in the art without departing from the spirit of the invention.

What is claimed is:

1. Microporous particles of polybenzimidazole resins selected from a group consisting of polybenzimidazoles and modified polybenzimidazoles functionalized by treatment with an organic or inorganic acid, said polybenzimidazole resin consisting essentially of reoccurring units selected from the formula:

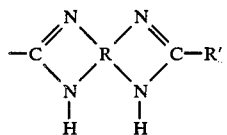

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group, and (3) a heterocyclic ring from the class consisting of (a) pyridine, (b) pyrazine, (c) furan, (d) quinoline, (e) thiophene. and (f) pyran, and the formula

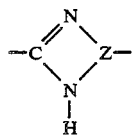

wherein Z is an aromatic nucleus having the nitrogen atoms forming the benzimidazole ring paired upon adjacent carbon atom of the aromatic nucleus, said microporous particles being characterized by a reduced bulk density, a specific surface area of at least about 10 m²/g, a porosity of at least about 10%, and an average pore diameter of from about 50 to about 500 angstroms.

2. The microporous particles of claim 1 in the form of substantially spherical beads.

3. The microporous particles of claim 2, wherein said particles comprise polybenzimidazole.

4. The microporous particles of claim 2, wherein said particles comprise a cation exchange polybenzimidazole resin having inorganic or organic acid groups covalently bonded thereto.

5. The microporous particles of claim 4, wherein said acid groups comprise sulfonate groups.

6. The microporous particles of claim 2, wherein said particles comprise an anion exchange polybenzimidazole resin having inorganic or organic acid groups ionically bonded thereto.

7. The microporous particles of claim 3, 4, 5 or 6, wherein said polybenzimidazole comprises poly-2,2'-(m-phenylene)-5,5'-bibenzimidazole.

8. The microporous particles of claim 7, wherein said particles have a porosity of at least about 20%; a specific surface area of at least about 25 m²/g; an average pore diameter of from about 75 to about 250 Angstroms; and an average particle size of from about 10 to about 1000 microns.

9. Microporous particles of polybenzimidazole resin selected from the group consisting of poly-2,2'-(m-phenylene)-5,5'-bibenzimidazole and sulfonated poly-2,2'-(m-phenylene)-5,5'-bibenzimidazole having an average particle size of from about 10 to about 1000 microns, a reduced bulk density, a surface area of at least 10 m²/g. a porosity of at least about 10%, and an average pore diameter of from about 50 to about 500 Angstroms.

10. The microporous particles of claim 9, wherein said polybenzimidazole resin comprises sulfonated poly-2,2'-(m-phenylene)-5,5'-bibenzimidazole having covalently bonded sulfonate groups and a degree of sulfonation corresponding to a sulfur content of from about 1 to about 10% by weight.

11. A process for the preparation of microporous particles of polybenzimidazole resin suitable for use as the stationary phase in chromatographic processes or supported chemical reactions, comprising the steps of:

(a) forming in a suitable solvent a 2 to about 10% solution of a polybenzimidazole resin consisting essentially of reoccurring units selected from the formula:

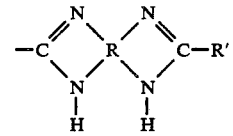

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group, and (3) a heterocyclic ring from the class consisting of (a) pyridine, (b) pyrazine, (c) furan, (d) quinoline, (e) thiophene, and (f) pyran, and the formula:

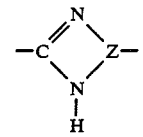

wherein Z is an aromatic nucleus having the nitrogen atoms forming the benzimidazole ring paired upon adjacent carbon atoms of the aromatic nucleus;

(b) emulsifying said polybenzimidazole solution with a non-polar organic solvent in a volume ratio of polybenzimidazole solution to non-polar organic solvent of from about 1:2 to about 1:4 under conditions of shear sufficient to produce substantially spherical droplets of polybenzimidazole resin;

(c) precipitating said spherical droplets of polybenzimidazole resin from said emulsion in the form of substantially spherical microporous beads by contacting said emulsion with a non-solvent for said polybenzimidazole resin; and (d) recovering the resulting microporous particles of polybenzimidazole resin.

12. A process for the preparation of microporous particles of polybenzimidazole resin suitable for use as the stationary phase in a chromatographic process or supported chemical reactions, comprising the steps of:

(a) forming in a suitable solvent a 2 to 20% by weight solution of a polybenzimidazole resin consisting essentially of reoccurring units selected from the formula:

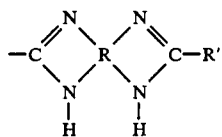

wherein R is a tetravalent aromatic nucleus, preferably symmetrically substituted, with the nitgrogen atoms forming the benzimidazole rings being paired upon adjacent carbon atoms i.e., ortho carbon atoms, of the aromatic nucleus, and R' is a member of the class consisting of (1) an aromatic ring, (2) an alkylene group, and (3) a heterocyclic ring from the class consisting of (a) pyridine, (b) pyrazine, (c) furan, (d) quinoline, (e) thiophene, and (f) pyran, and the formula:

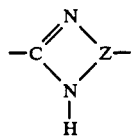

wherein Z is an aromatic nucleus having the nitrogen atoms forming the benzimidazole ring paired upon adjacent carbon atoms of the aromatic nucleus;

(b) converting the solution of step (a) into a stream of finely divided liquid droplets;

(c) quenching said stream of liquid droplets with a non-solvent for the polybenzimidazole resin to produce solidified microporous particles of polybenzimidazole resin; and (d) recovering the resulting microporous particles of polybenzimidazole resin.

13. The process of claim 11, wherein said solvent of step (a) is N,N-dimethylacetamide or concentrated sulfuric acid; said non-polar organic solvent of step (b) is a halogenated solvent or an aliphatic petroleum solvent; and said non-solvent of step (c) comprises an aliphatic alcohol of from about one to four carbon atoms.

14. The process of claim 11, wherein said non-solvent of step (c) comprises methanol.

15. The process of claim 11, wherein the emulsion of step (b) further comprises up to about 2% by weight of a surfactant to stabilize said emulsion, and up to about 5% by weight of a pore forming additive.

16. The process of claim 11, further comprising the step of treating the recovered particles of polybenzimidazole resin with a solution of an organic or inorganic acid having an acid concentration of from about 1 to about 10 percent by weight in order to modify the functional properties of the resin.

17. The process of claim 11, wherein up to about 15% by weight of an organic or inorganic acid is included in said polybenzimidazole solution of step (a) in order to modify the functional properties of the resin.

18. The process of claim 13, wherein the solvent of step (a) is concentrated sulfuric acid, and said process further comprises the step of heat setting the recovered microporous polybenzimidazole particles at a temperature of greater than 180° C. for at least about 30 minutes in order to covalently sulfonate the polybenzimidazole resin.

19. The process of claims 16 or 17, wherein said acid is selected from the group consisting of sulfuric acid, organic sulfonic acids and mixtures thereof, and said process further comprises heat setting the acid treated microporous resin particles at a temperature of greater than 180° C. for at least about 30 minutes in order to covalently sulfonate the polybenzimidazole resin.

20. The process of claim 12, wherein the solution of step (a) is convered into a stream of liquid droplets by spraying techniques.

21. The process of claim 20, wherein said solvent of step (a) is N,N'-dimethylacetamide or concentrated sulfuric acid; and said non-solvent of step (c) comprises an aliphatic alcohol of from about one to four carbon atoms.

22. The process of claim 21, wherein said non-solvent of step (c) comprises methanol.

23. The process of claim 12, wherein the solution of step (a) further comprises up to about 5% by weight of a pore forming additive.

24. The process of claim 12, further comprising the step of treating the recovered particles of polybenzimidazole resin with a solution of an organic or inorganic acid having an acid concentration of from about 1 to about 10 percent by weight in order to modify the functional properties of the resin.

25. The process of claim 12, wherein up to about 15% by weight of an organic or inorganic acid is included in said polybenzimidazole solution of step (a) in order to modify the functional properties of the resin.

26. The process of claim 12, wherein the solvent of step (a) is concentrated sulfuric acid, and said process further comprises the step of heat setting the recovered microporous polybenzimidazole particles at a temperature of greater than 180° C. for at least about 30 minutes in order to covalently sulfonate the polybenzimidazole resin.

27. The process of claim 24 or 25, wherein said acid is selected from the group consisting of sulfuric acid, organic sulfonic acids and mixtures thereof, and said process further comprises heat setting the acid treated microporous resin particles at a temperature of greater than 180° C. for at least about 30 minutes in order to covalently sulfonate the polybenzimidazole resin.

* * * * *